United States Patent [19]
Hehl

[11] Patent Number: 5,024,593
[45] Date of Patent: Jun. 18, 1991

[54] APPARATUS FOR TRANSPORTING MOLDINGS FROM AN INJECTION MOLDING MACHINE

[76] Inventor: Karl Hehl, Arthur-Hehl-Str. 32, D-7298 Lossburg 1, Fed. Rep. of Germany

[21] Appl. No.: 406,265

[22] Filed: Sep. 12, 1989

[30] Foreign Application Priority Data

Sep. 12, 1988 [DE] Fed. Rep. of Germany ....... 3830958

[51] Int. Cl.$^5$ ...................... B29C 45/40; B65G 60/00
[52] U.S. Cl. .................................... 425/556; 414/331; 414/788.2; 414/788.7; 414/794.7; 425/253
[58] Field of Search ..................... 425/182, 253, 403.1, 425/452, 556, 254, 255; 414/331, 788.2, 788.4, 788.7, 793.4, 790.9, 794.7

[56] References Cited

U.S. PATENT DOCUMENTS

| | | | |
|---|---|---|---|
| 4,361,411 | 11/1982 | DiLiddo | 414/331 X |
| 4,687,403 | 8/1987 | Motoda | 414/788.7 X |
| 4,737,095 | 4/1988 | Hehl | 425/190 |
| 4,874,282 | 10/1989 | Orikasa et al. | 414/788.4 X |

FOREIGN PATENT DOCUMENTS

63-1632  1/1988  Japan .................................. 414/788.4
8302899  8/1983  Netherlands .

Primary Examiner—Robert J. Spar
Assistant Examiner—Janice Krizek
Attorney, Agent, or Firm—Spencer & Frank

[57] ABSTRACT

An apparatus for transporting moldings from an injection molding machine includes molding receptacles formed of stackable pallets, which are stackable to form stacks. A pallet tower includes an elevator, which is movable along vertical skeleton members. The stackable pallets are movable from stationary pallet tracks of a filling station disposed in the injection molding machine into the pallet tower and in the pallet tower can be coupled to a handling pallet, which is supported in the elevator, to form a load unit. By use of a transfer arrangement the load unit is adapted to be transferred to a transporting assembly for transporting the load unit along a linear path.

18 Claims, 12 Drawing Sheets

APPARATUS FOR TRANSPORTING MOLDINGS FROM AN INJECTION MOLDING MACHINE

BACKGROUND OF THE INVENTION

1. Field of the Invention

This invention relates to an apparatus for transporting from an injection molding machine the moldings which have been produced by injection molding and are received by molding receptacles, which are filled in a filling station disposed adjacent to the injection molding machine and are transferred to transporting means by transfer means.

2. Description of the Prior Art

A known apparatus of that kind is disclosed in U.S. Pat. No. 4,737,095. In that known apparatus the moldings falling out of the injection mold are placed by means of conveyor belts into a molding receptacle, which is disposed in a filling station. When the molding receptacle has been filled, it is transferred to a truck, which is movable on a linear path, which is parallel to the vertical longitudinal plane of symmetry of the injection molding machine. That truck is also designed for a transportation of injection molds which have been or are to be used in the injection molding machine and the truck can transport a molding receptacle and an injection mold at the same time. Although the transport from the machine can thus be rationalized, there may be bottlenecks of time if numerous transport movements are to be performed, particularly because only a single truck can travel, as a rule, on the associated track.

It is also known (NL 83 02 899) to provide an apparatus for stacking stackable injection moldings, which in dependence on their periodic discharge from the injection mold are supplied via a chute individually or in groups. By means of two decks, the arriving moldings are moved in alternation to positions over a stacking apparatus and are then consectively released from suction cups in registry with a columnar stack. The columnar stack composed of the superimposed moldings is then moved on a horizontal path into a magazine which is associated with the apparatus.

SUMMARY OF THE INVENTION

It is an object of the invention to provide an apparatus which is of the kind described first hereinbefore and which is so improved that the required operating time of the means for transporting the molding containers can greatly be reduced and the transfer means of the apparatus are designed for a transport of full pallets from the filling station and for a supply of empty pallets to the filling station.

That object is accomplished in accordance with the invention in that the molding receptacles consist of stackable pallets, a pallet tower is included in the apparatus and comprises an elevator, which is movable along vertical skeleton elements of the pallet tower, the stackable pallets are movable from pallet tracks of the filling station into the pallet tower and in the pallet tower are adapted to be coupled to a handling pallet, which is supported on the elevator, to form a load unit, and the elevator is adapted to contain at least one load unit comprising full stackable pallets and at least one additional load unit comprising empty stackable pallets.

In such an apparatus, load units can be formed by periodic vertical movements of the elevator loaded with full stackable pallets 55 and said load units can be pulled out of the pallet tower on the rear. On the other hand, empty stackable pallets will always be available in the pallet tower and can periodically be moved into the filling station. Such empty stackable pallets have been supplied in the form of load units to the pallet tower from the rear.

DETAILED DESCRIPTION OF THE PREFERRED EMBODIMENTS

Illustrative embodiments of the invention will now be explained more in detail with reference to the drawing.

Figure 1:
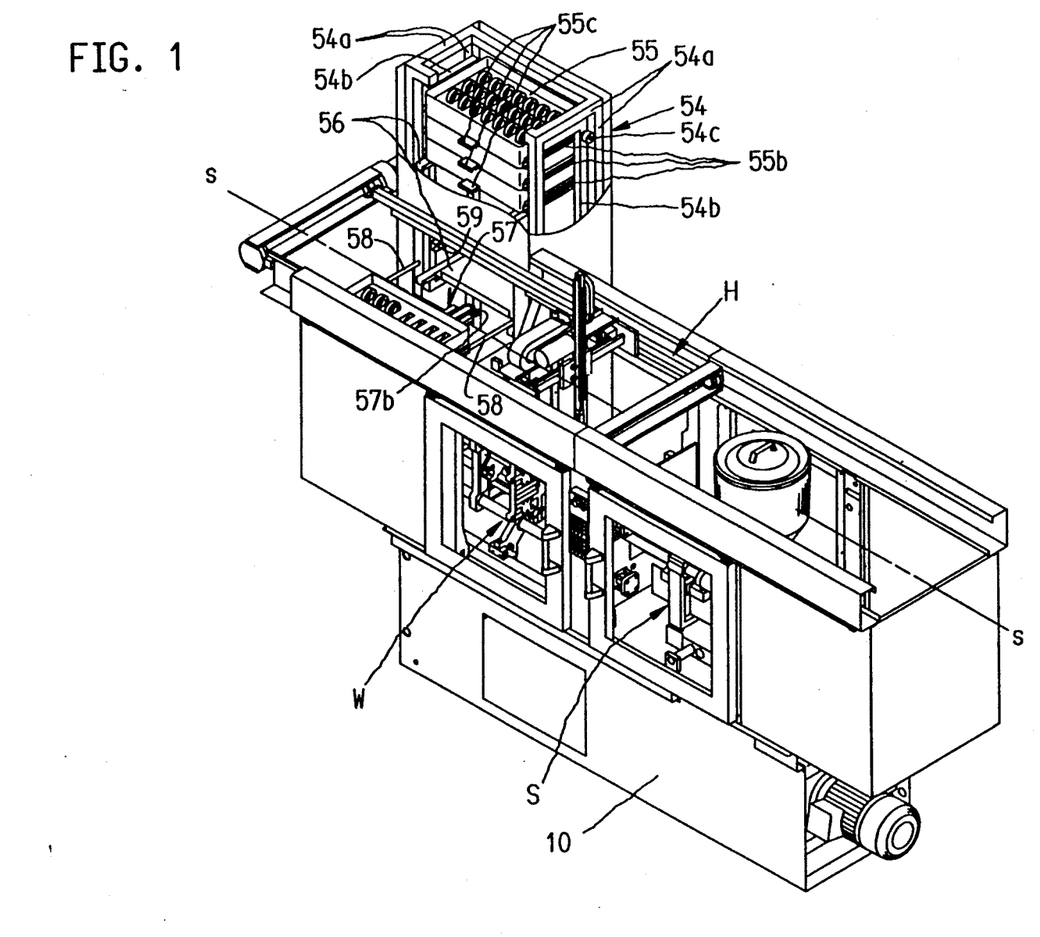
FIG. 1 is a perspective view showing the apparatus in association with an injection molding machine with the filling station for the molding receptacle disposed within the vertical projection of the injection molding machine.
Figure 2:
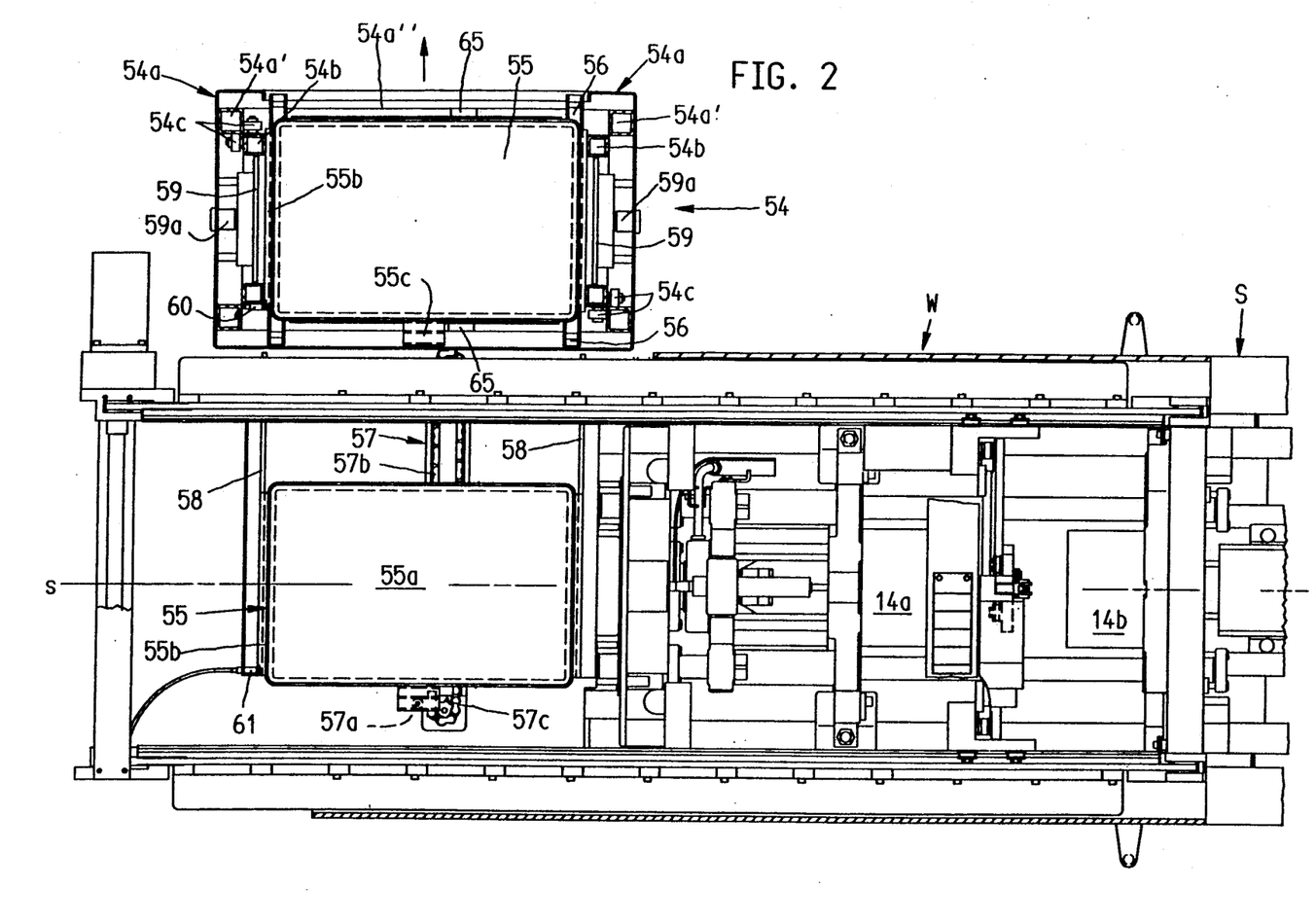
FIGS. 2 and 3 are, respectively, a top plan view and an end elevation showing the apparatus which has been integrated in the injection molding machine.
Figure 3:
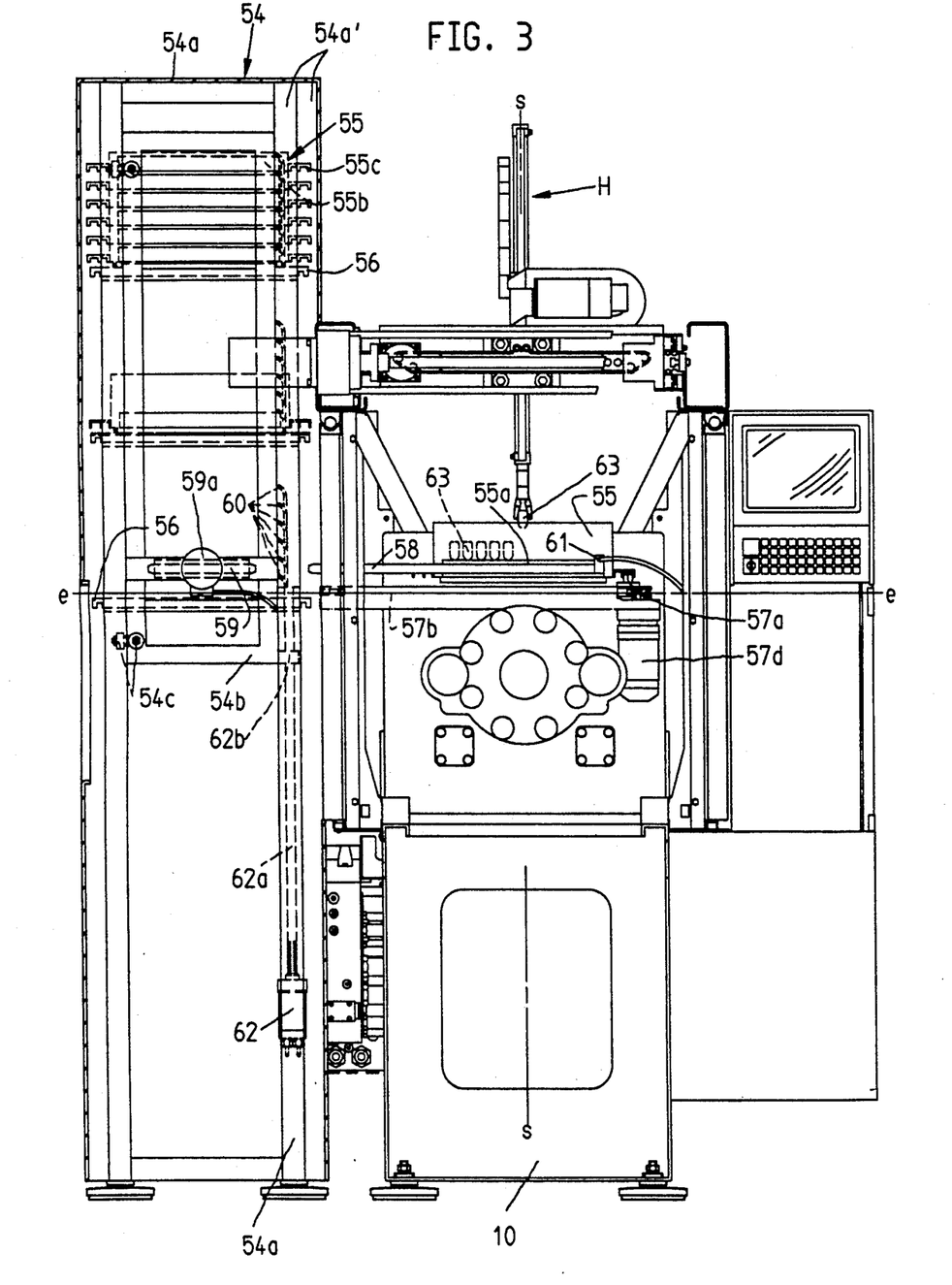
Figure 4:
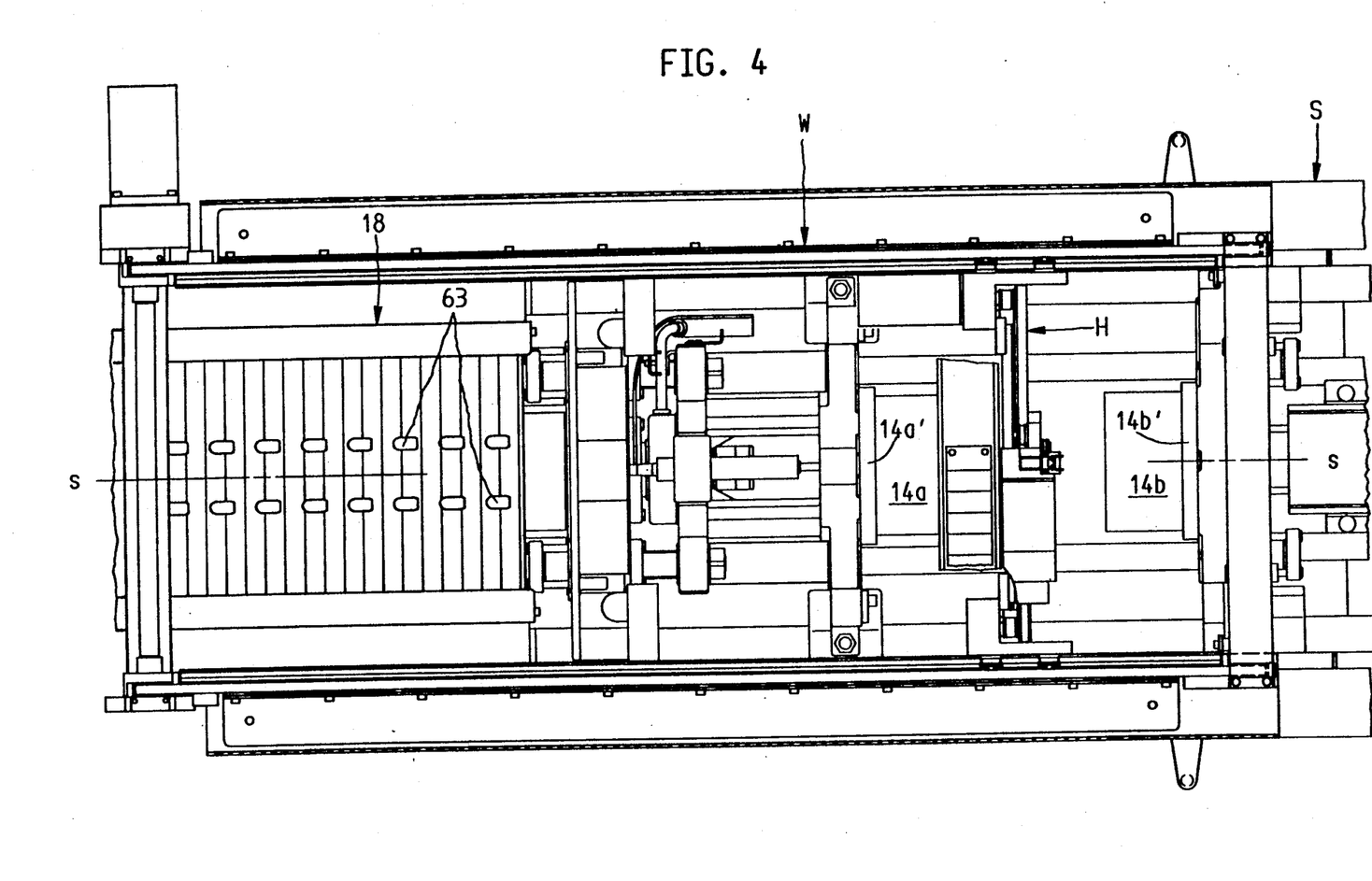
FIGS. 4 and 5 illustrate a variant of the apparatus with the filling station disposed outside the vertical projection of the injection molding machine.
Figure 5:
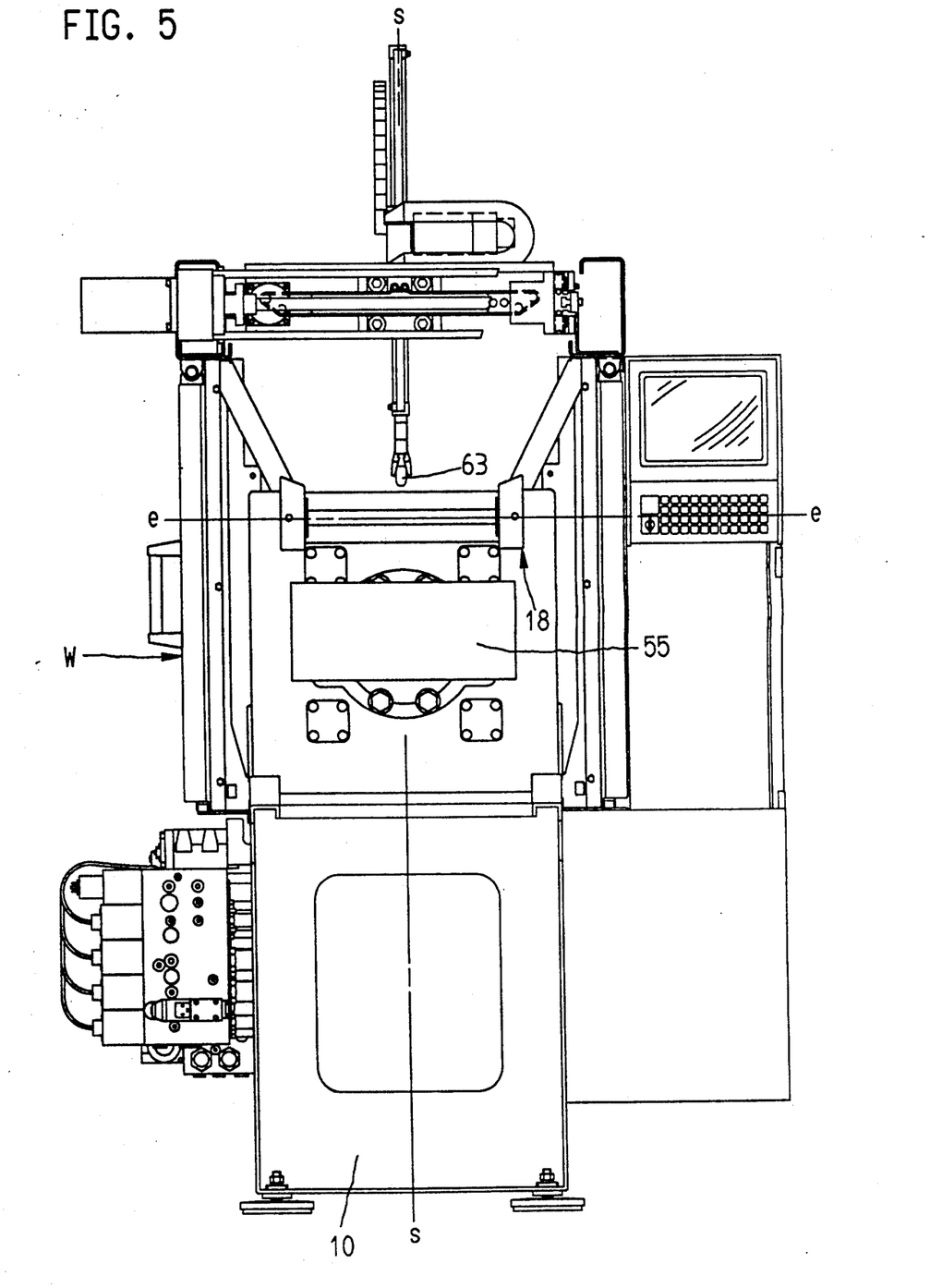

The apparatus in accordance with the invention is associated with an injection molding machine, which comprises a horizontal injecting unit S and a horizontal clamping unit W. Said two units are supported by a machine pedestal 10. The moldings 63 which have been formed by injection molding are removed from the injection molding machine by means of stackable pallets 55, which are filled in a filling station, which is disposed adjacent to the injection molding machine. In the illustrative embodiments of the invention the filling station is selectively disposed either within the injection molding machine, as is shown in FIGS. 1 to 3, or outside the machine adjacent to that end thereof which defines the clamping unit, as is shown in FIGS. 4 and 5. In the former case the stackable pallet 55 is filled by means of a demolding device H, which removes the moldings 63 from the injection mold when it is open and the moldings are placed in rows into and retained by recesses 55g (FIG. 7) by an intermittent movement of a gripper in a direction which is transverse to the longitudinal vertical plane of symmetry s—s of the machine. In the second case the stackable pallet 55 is filled by means of a belt conveyor 18, which transports the moldings along a path which is parallel to the plane of symmetry s—s. The moldings are placed on the belt conveyor 18 by the gripper of the demolding device. The stackable pallet 55 may alternatively be filled by a conveyor belt, which receives the moldings as they fall out of the injection mold when it is open, as is shown in FIG. 5.

Figure 6:
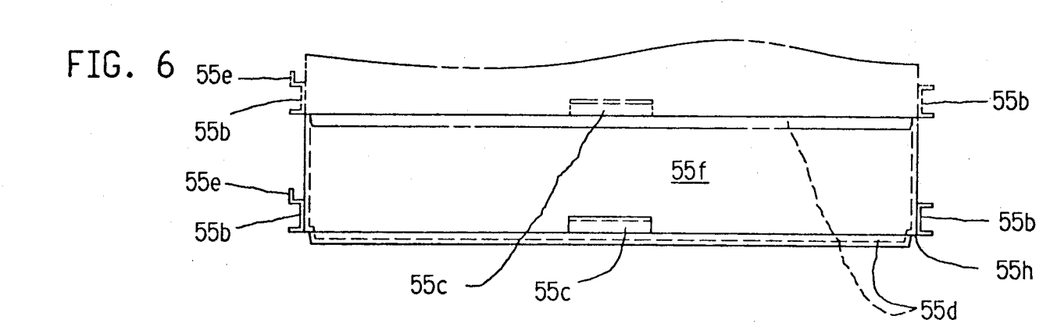
FIGS. 6 to 8 are enlarged views taken in different directions and showing a stackable pallet which constitutes a molding receptacle of the apparatus.
Figure 6A:
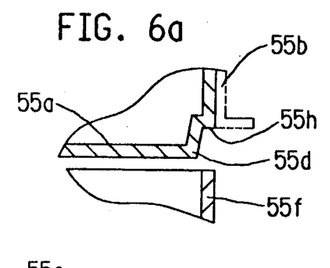
Figure 7:
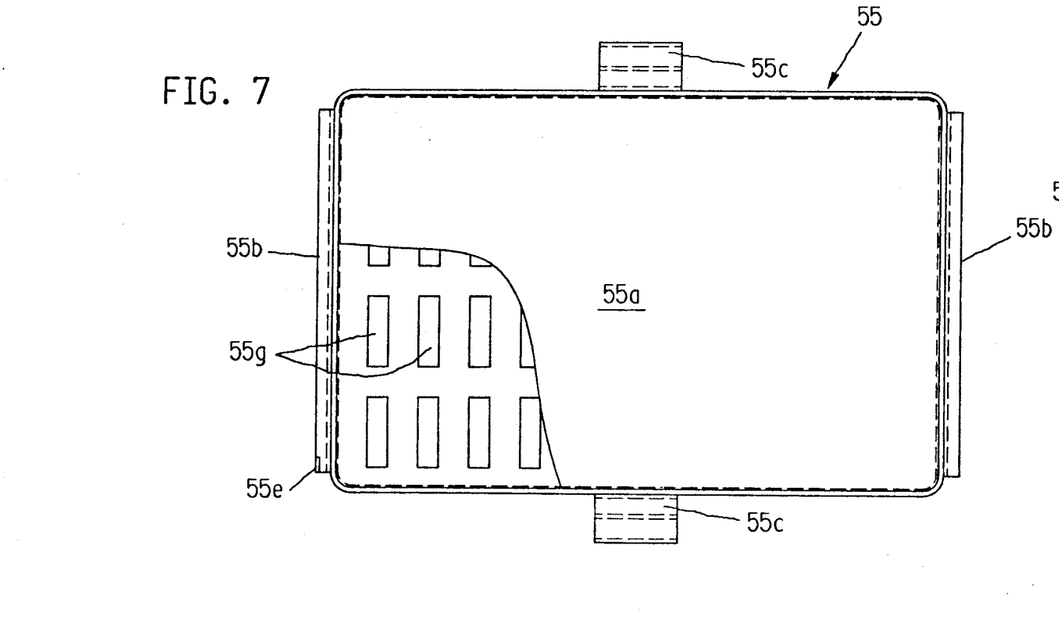
Figure 8:
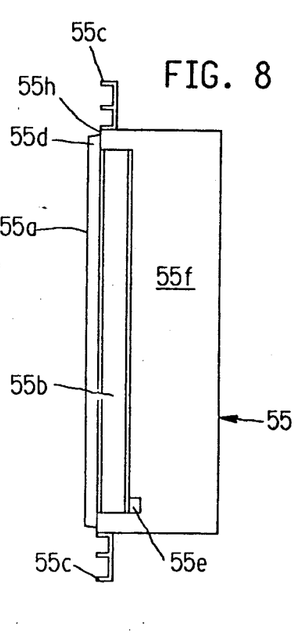
Figure 9:
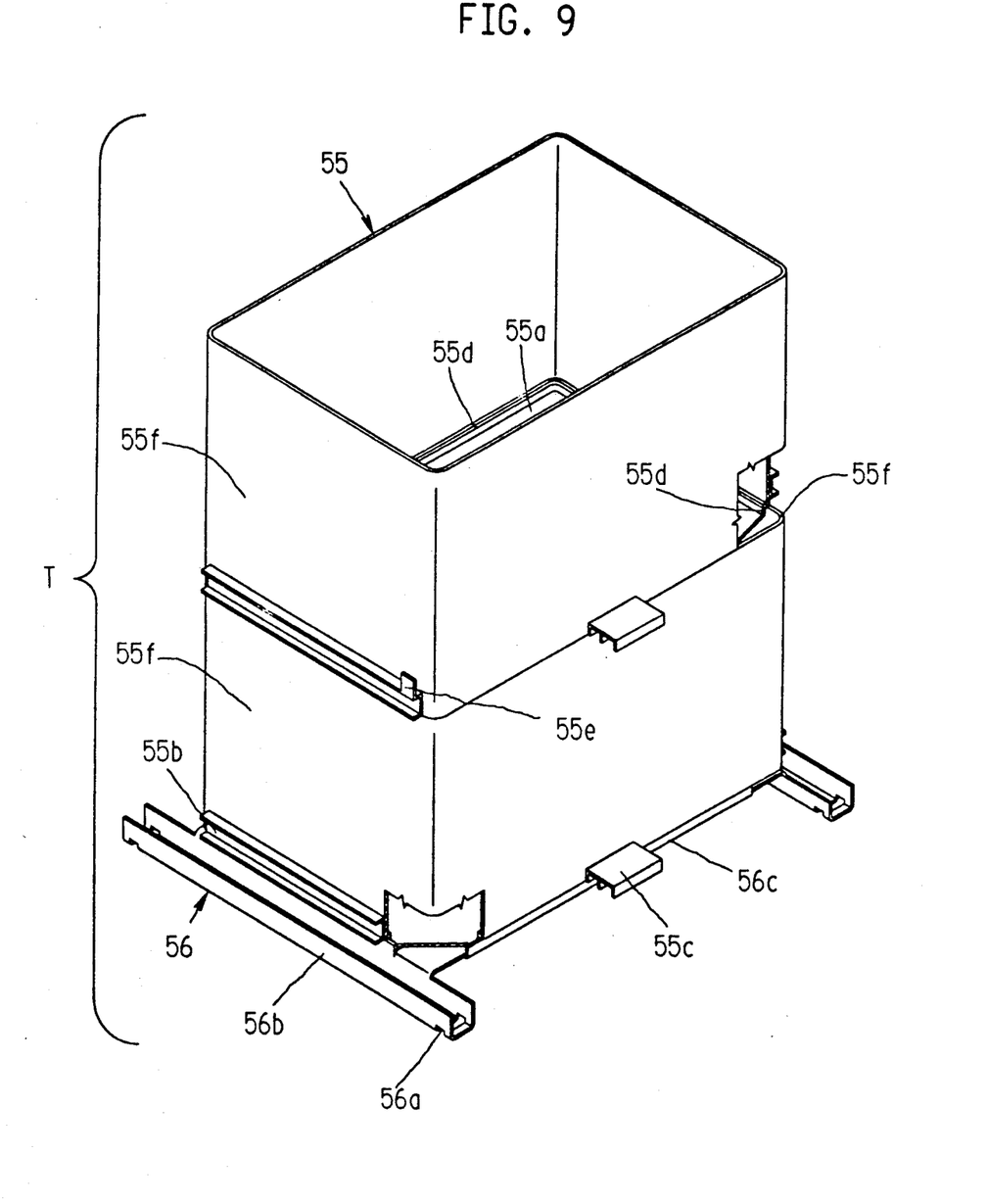
FIGS. 9 to 11 show a handling pallet and respective stacks consisting eahc of a plurality of stackable pallets carried by said handling pallet.
Figure 10:
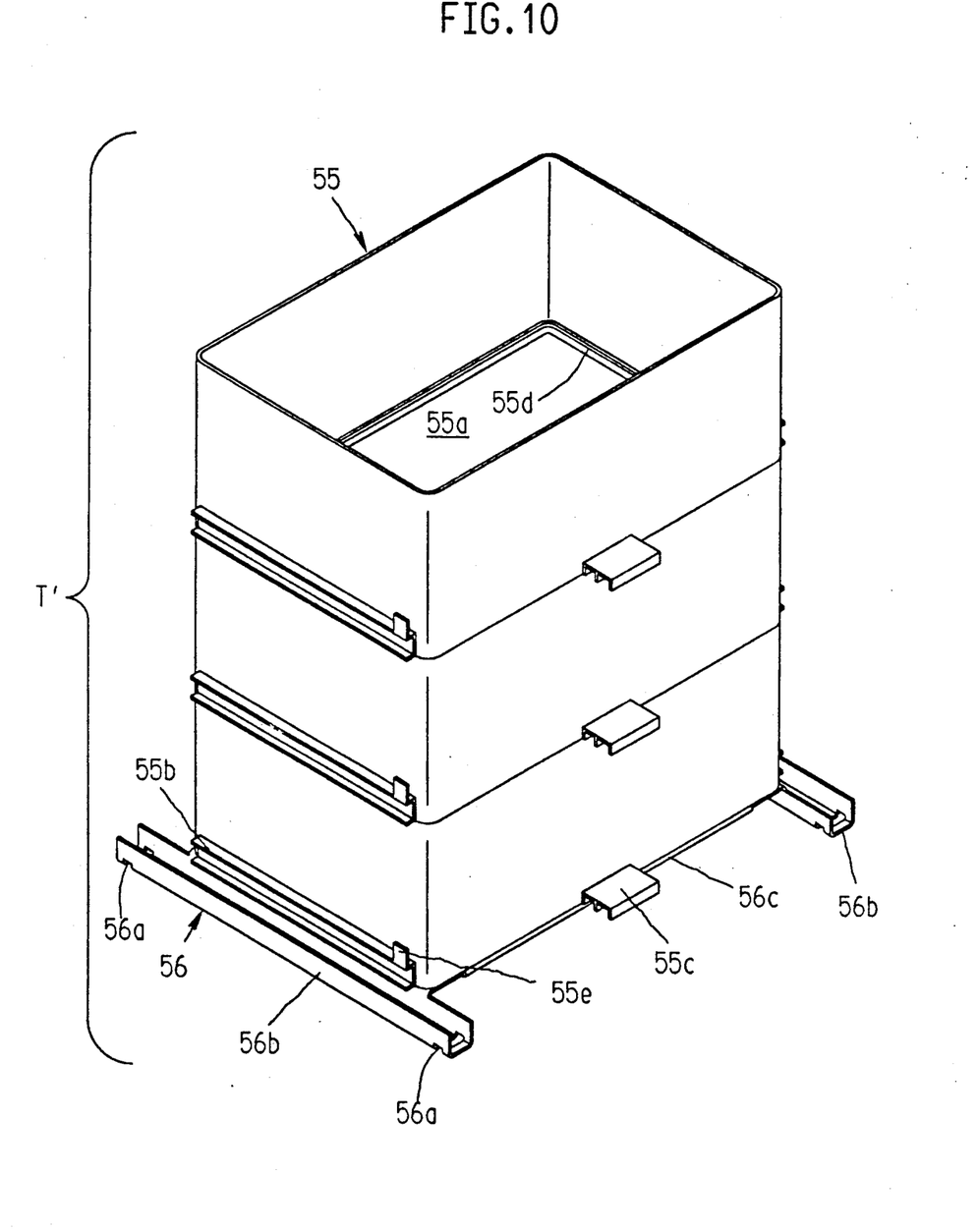
Figure 11:
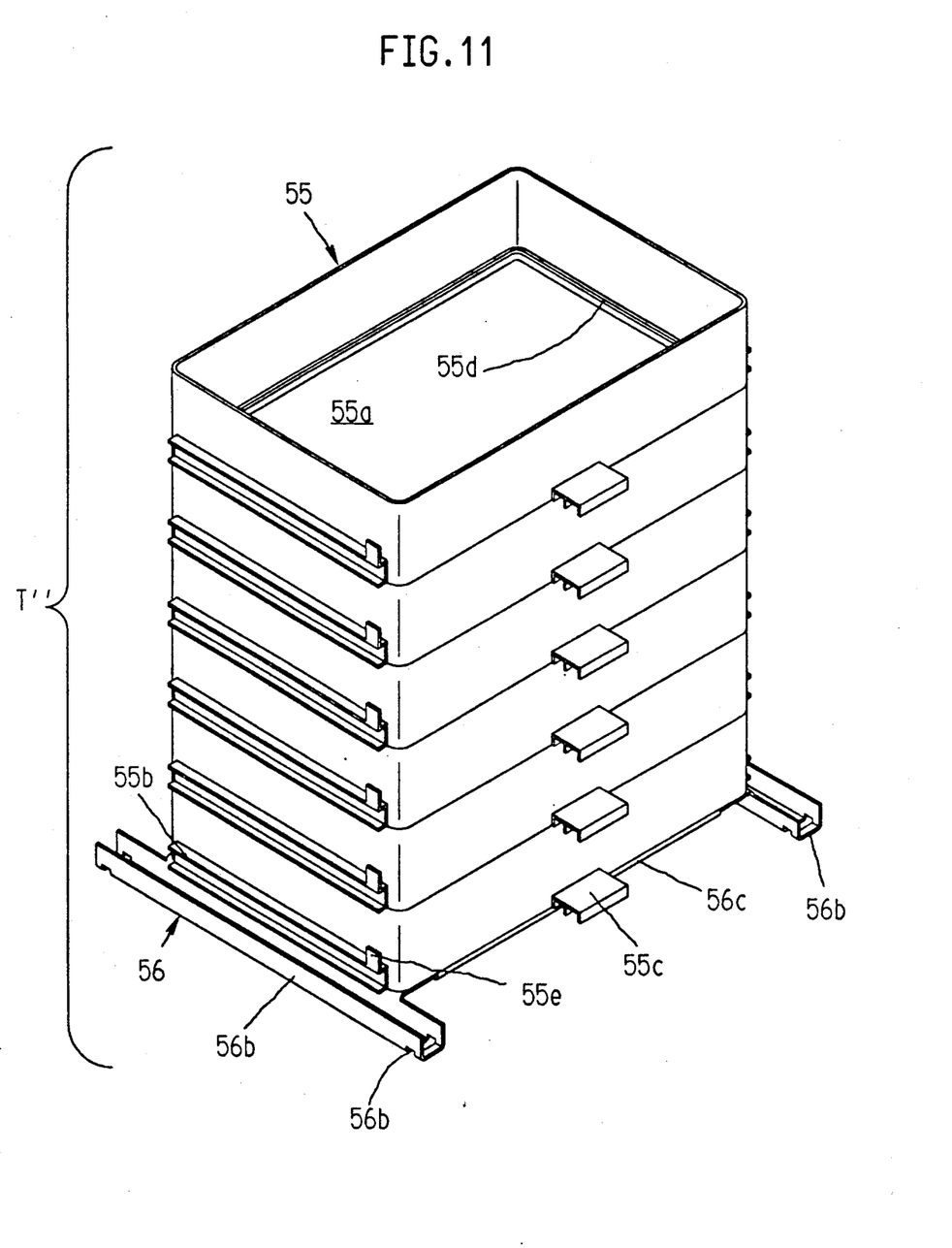

The stackable pallets 55 are so designed that they can be stacked to form stacks in which the pallets center each other. The stackable pallets 55 are stacked to form stacks in a pallet tower 54, which is disposed between the filling station and another transport means, such as a truck or a roller conveyor. In the embodiment which is shown by way of example the pallet tower 54 is disposed on the rear of the injection molding machine outside the vertical projection of the machine. The pallet tower is placed on the floor and protrudes above the injection molding machine. The pallet tower 54 comprises a skeleton structure 54a, which consists of section members, inclusive of vertical skeleton members 54a', along which an elevator 54b is movable on rollers 54c. The skeleton structure 54a is provided with two pallet tracks, which will be described hereinafter as adjustable pallet tracks 59 because their spacing is adjustable. The stackable pallets 56 are movable from the filling station into the pallet tower 54 on stationary pallet tracks 58 and on the adjustable pallet tracks 59. By a vertical movement of the elevator 54b, which carries a handling pallet 56, the stackable pallets 55 can be coupled to said handling pallet 56 to form a load unit T; T'; T" as is shown in FIGS. 9 to 11. Each of the adjustable pallet tracks 59 is secured to the piston rod of a hydraulic cylinder 59a, which is supported on the skeleton structure 54a of the pallet tower 54. The drive means for displacing the stackable pallet 55 from the filling station into the pallet tower 54 and vice versa comprises an endless chain 57b, which is disposed below the stackable pallet 55 when it is in the filling station. As is apparent from FIG. 2 the pivot pins of the chain 57b, which constitutes a link chain, are vertical and at least one coupling pin 57a of the chain protrudes upwardly from the chain. By a semicircular movement of the chain 57b around the chain sprocket 57c that coupling pin 57a can be coupled to a stackable pallet 55 which is disposed in the filling station or in the pallet tower 54. The coupling is effected in that the coupling pin 57a is constrained to perform a lateral movement into a coupling element 55c, which is secured to the stackable pallet 55. The elevator 54b is rectangular in a top plan view and comprises four vertical tubular posts, which are interconnected by crosspieces. The elevator is vertically movable by a lifting screw 62a, which is supported by the skeleton structure 54a and can be rotated by a lifting motor 62. The screw 62a is screwed into a nut 62b, which is secured to the elevator. The stackable pallet 55 comprises a pallet bottom 55a, which is designed to retain the moldings 63 at fixed locations, which are arranged in rows. The moldings are retained in recessed 55g, which conform to respective moldings and are shown in FIG. 7. The bottom 55a is surrounded by a vertical guard wall 55f. As is particularly apparent from FIGS. 6 and 8 the vertical projection of the bottom 55a is smaller than the vertical protection of the guard wall. Besides, the bottom is connected to the vertical guard wall by a centering portion 55d, which is slightly inclined from the vertical (FIG. 6a). Each stackable pallet 55 comprises horizontal supporting surfaces 55h. The supporting surfaces 55h of the uppermost stackable pallet 55 of each stack rest on the guard wall 55f of the next lower stackable pallet. The uppermost stackable pallet extends into said next lower stackable pallet. Stackable pallets having guard walls equal in height can be stacked to form stacks which have the same overall dimensions. Each stack may comprise stackable pallets 55 having higher or lower guard walls and the number of stackable pallets in each stack will depend on the height of said guard walls. For instance, FIGS. 9 to 11 illustrate stacks which consist of two, three and six stackable pallets, respectively. Each stack is supported on and centered by a handling pallet 56 to form a load unit therewith. The handling pallet 56 comprises a profiled supporting surface, which is complementary to the profiled supporting surface of an injection mold 14a, 14b. That profiled supporting surface of the handling pallet 56 is constituted by two parallel track rails 56b, which are interconnected by at least one crosspiece. The track rails 56b have the same shape in cross-section as the engaging plates 14a', 14b' of the injection mold 14a, 14b shown in FIGS. 9 and 10. The purpose of said equality of shape will be set forth hereinafter.

The height of the pallet tower 54 is more than twice the height of the elevator 54b, which in the embodiment shown by way of example can carry three superimposed load units T; T'; T". In addition, the elevator 54b is adapted to support a plurality of handling pallets 56, which are spaced apart a distance which is at least as large as the height of a load unit. One of the three handling pallets 56 of the elevator 54b is designed to constitute a load unit T; T' or T" with full stackable pallets 55, which are filled with moldings 63. The two other handling pallets 56 are designed to constitute load units with empty stackable pallets 55. On a predetermined transfer level, which equals the level of the filling station, the load units can be moved out of and into the pallet tower 54 on the rear. The elevator 54b of the pallet tower also comprises over each handling pallet 56 a plurality of non-contacting signal generators 60 for a detection of pallets. The number of signal generators 60 provided over each handling pallet corresponds to the largest number of pallets which can be included in a stack. The spacing of the signal generators over each handling pallet equals the height of a stackable pallet having the lowest guard wall. A non-contacting signal generator 61 for detecting stackable pallets is also provided at the end of the filling station. The filling station shown in FIGS. 1 to 3 is disposed within the vertical projection of the injection molding machine. That embodiment can be converted with a relatively small amount of work to the embodiment which is shown in FIGS. 4 and 5 and in which the filling station is disposed outside the vertical projection of the injection molding machine in front of that end face of the injection molding machine at which the clamping unit W is disposed. For a conversion from the embodiment shown in FIGS. 1 to 3 to the embodiment shown in FIGS. 4 and 5 and vice versa it is substantially sufficient to replace the stationary pallet tracks 58 of the filling station by an endless belt conveyor 18, which is disposed on the same level as the stationary pallet tracks 58, and vice versa. The demolding device places the moldings 63 on the conveying surface of the conveyor belt 18 at locations which correspond to the locations at which the moldings are placed on stackable pallets in the embodiment shown in FIGS. 1 to 3. For this reason the stationary pallet tracks 58 of the filling station of the embodiment shown in FIGS. 1 to 3 and the conveying surface of the belt conveyor of the embodiment shown in FIGS. 4 and 5 extend approximately in the same horizontal plane, which is designated e-e in FIG. 3 and is approximately level with the top edge of the injection mold 14a, 14b.

The load units T; T', T" which have been formed in the pallet tower 54 are transferred to the further transporting means, which preferably consist of a truck F, which is movable on a path that is parallel to the plane of symmetry s-s. The truck F which is shown in a schematic and fragmentary manner in FIGS. 12 and 12a and which has a transport chain F' need not be described in detail here because a suitable truck is disclosed in U.S. Pat. No. 4,737,095. The known truck comprises guiding and retaining means for a selective handling of injection molds or load units simultaneously or in alternation. Each of said load units comprises a handling pallet, which has a profiled supporting surface which has the same shape as the profiled supporting surface of the injection mold.

The profiled shape of the engaging plates 14a', 14b' of the injection mold is simulated by the track rails 56b of the handling pallet 56. The fact that the truck F can be used to carry load units and injection molds on the same supporting surfaces results in an important rationalization of the handling system associated with the injection molding machine. For that purpose the truck is provided with receiving and delivering means, which are intended to move the injection mold 14a, 14b or a load unit (which according to the prior art consists of a handling pallet and a plasticizing cylinder) in a direction which is transverse to the direction of travel of the truck. The receiving and delivering means comprise driving and displacing means, which preferably consist of an endless conveyor chain. With that design, load units comprising full stackable pallets can be pulled out of the pallet tower 54 onto the truck and load units comprising empty stackable pallets can be pushed from the truck into the pallet tower 54. For said delivering and receiving operations the receiving and delivering means of the truck comprise an endless chain, which is provided with at least one coupling pin. The handling pallet 56 has at least one track rail 56b, which is provided with a transverse groove 56a and the coupling pin of the chain can be moved into the transverse groove 56c for a coupling operation and can be moved out of said groove for an uncoupling operation.

Figures 12A, 12B:
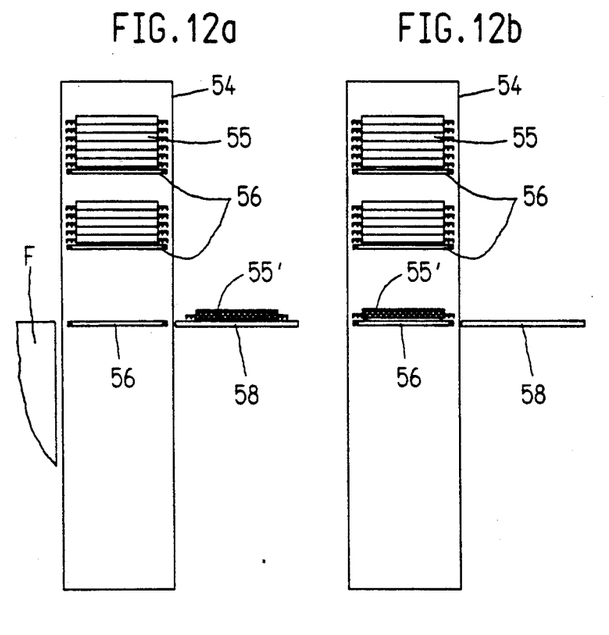
FIGS. 12a to 12f and 12a' to 12f' are diagrammatic representations illustrating the automatically performed stacking operation for forming load units consisting each of a stack and a handling pallet.
Figure 12A:
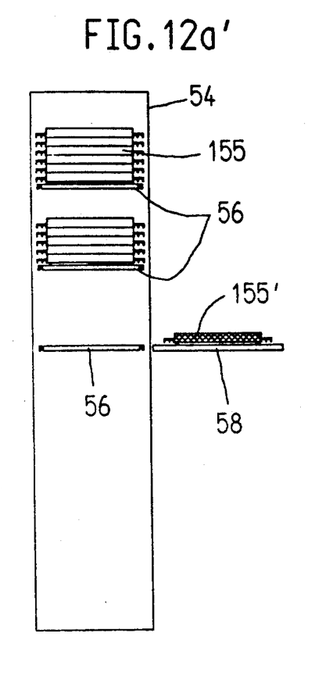
Figure 12B:
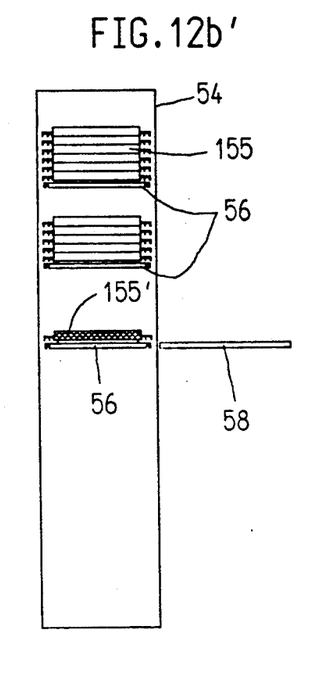

Concrete operations by which the load units T; T'; T" comprising the handling pallets 55 are assembled are apparent from FIGS. 12a to 12f. FIG. 12a shows the full stackable pallet 55', which is still disposed adjacent to the injection molding machine. Two load units which comprise an empty handling pallet 56 and stackable pallets 55 are arranged in the top portion of the elevator in the pallet tower 54.

Figure 12C:
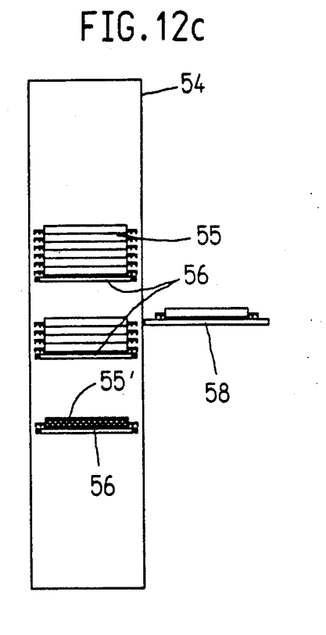
Figure 12D:
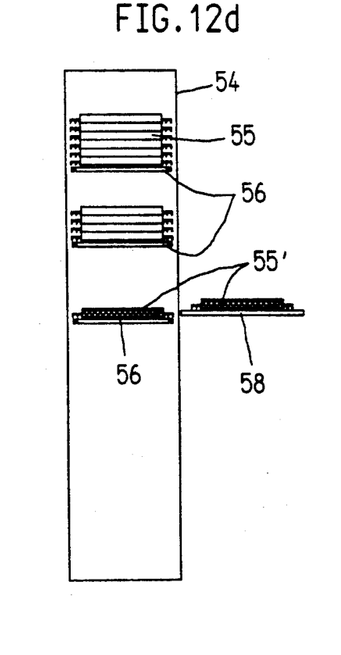
Figure 12E:
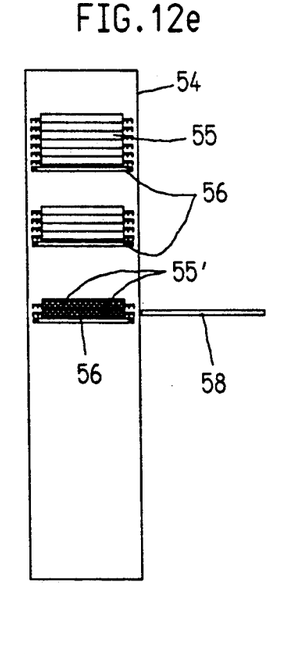

It is apparent from FIG. 12b that the full stackable pallet 55' has been pushed from the filling station onto the adjustable tracks 59 of the pallet tower and the elevator 54b has subsequently been raised a small distance so that the empty handling pallet 56 has engaged the underside of the stackable pallet 55' which has been inserted and the handling pallet 56 has thus been centered. By means of the hydraulic cylinders 59a the pallet tracks 59 are then moved further apart so that the elevator is free for a vertical movement. The lifting screw drive 62a, 62b is then operated to raise the elevator 54b to the position which is shown in FIG. 12c and in which the empty uppermost stackable pallet 55 of the next upper load unit is on the same level as the pallet tracks 59, which have been moved to have a large spacing. Thereafter the pallet tracks 59 are moved to have a small spacing so that they support the uppermost stackable pallet 55. Before that empty stackable pallet 55 can be moved into the filling station, the empty stackable pallet 55 must be separated from the associated pallet stack. For that purpose the elevator is lowered until the stackable pallet is free to perform a horizontal movement. The drive means 57 are then operated to move the empty stackable pallet 55 on the pallet tracks 58, 59 into the filling station, in which the pallet 55 rests on the stationary pallet tracks 58 in the position which is shown in FIG. 12c and in which the stackable pallet is filled in the filling station. When the adjustable pallet tracks 59 have then been adjusted to have a large spacing, the elevator 54b is raised to the position which is shown in FIG. 12d and in which another full stackable pallet 55' can be moved into the elevator so that the position shown in FIG. 12e is assumed. By a slight vertical movement of the elevator the handling pallet 56 on which a stackable pallet 55 has been placed is moved to such a position that both full stackable pallets 55' are in a stacked position, in which the guard wall of the lower full stackable pallet 55' surrounds the bottom of the upper full stackable pallet 55' so as to center the latter. The adjustable pallet tracks 59 are then moved to have a large spacing so that the elevator is again free to perform a vertical movement. The elevator is then lowered to the position shown in FIG. 12f, etc. Consecutive load units T; T'; T" are assembled by the process steps described. When a load unit has been assembled, that load unit is pulled out from the pallet tower 54 at the rear and is transferred onto the truck. When all empty stackable pallets have been used to form load units, the truck is operated to supply load units comprising empty stackable pallets to the pallet tower so that the position shown in FIG. 12a will be achieved. The non-productive times can be reduced because two load units comprising empty stackable pallets are available in the pallet tower. Such non-productive times would otherwise occur whenever all empty stackable pallets of the pallet tower have been consumed and a load unit comprising full stackable pallets must be removed from the tower before a load unit comprising empty stackable pallets can be moved into the pallet tower. For the procedure which has been described it makes no difference whether the two load units comprising empty stackable pallets are disposed over or under the load unit which includes full stackable pallets and is just being assembled. The stacks comprising empty stackable pallets will usually be disposed in alternation over and under the stack which is to be assembled from full stackable pallets.

As is apparent from FIG. 2 the track rails 56b of the handling pallets 56 are supported on horizontal skeleton members 54a" of the skeleton structure 54a as the load units T; T'; T" are moved out of and into the pallet tower 54.

For a detection of pallets in the pallet tower, the signal generators 60 inductively cooperate with code noses 55e of the stackable pallets 55. In each stack, the uppermost stackable pallet 55 is supported at its supporting surfaces 55h (FIG. 6a) on the top edge of the guard wall of the next lower stackable pallet. The endless chain 57b of the drive means 57 in the filling station is driven by the drive motor 57d, as is shown in FIG. 3. During their displacement into and out of the pallet tower 54 the stackable pallets 55 are supported at their guide bars 55b on the pallet tracks 58, 59.

Figure 13:
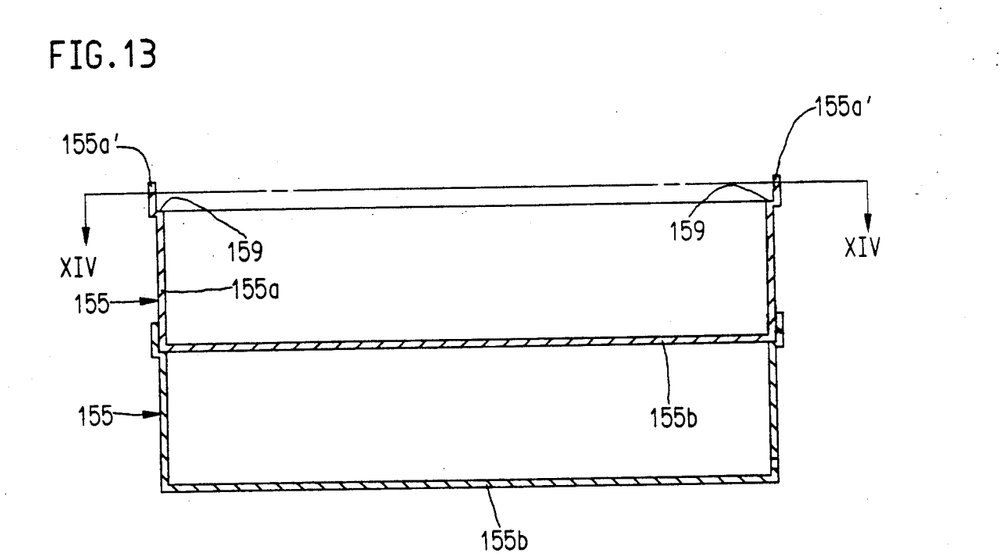
FIGS. 13 and 14 are, respectively, a vertical sectional view and a fragmentary horizontal sectional view showing a modified stackable pallet for use in the apparatus.
Figure 14:
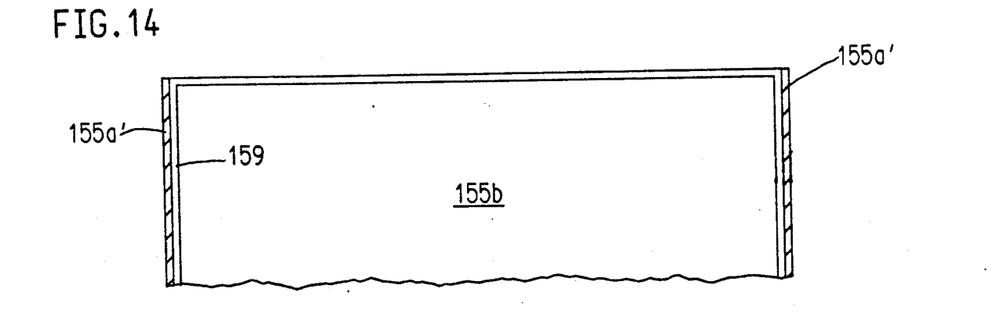

FIGS. 13 and 14 show a different stackable pallet 155, which can more easily be stacked in the pallet tower 54. In that embodiment the two walls 155a which are parallel to the direction in which the pallet is displaced have outwardly offset end portions 155a'. Horizontal supporting surfaces are provided at the base of the end portion and constitute pallet tracks 159 for guiding a full stackable pallet 155' coming from the stationary pallet tracks 58 of the filling station or for guiding an empty stackable pallet 155 which is to be transferred from the pallet tower 54 into the filling station.

The crosspiece 56c of the handling pallet 56 is provided with longitudinal tracks, which are arranged and designed to conform to the track-forming end portions 155a' of the walls 155a of the stackable pallets 155. In each load unit, the lowermost stackable pallet 155 of the stack to be formed is supported and guided on and centered by the handling pallet 56, which is supported on the elevator 54b. Each upper stackable pallet 155 is supported on and guided on and centered by the next lower stackable pallet 155. For this reason the adjustable pallet tracks 59, which in the embodiment shown in FIGS. 1 and 12 are supported on the skeleton structure 54a, and the means for actuating said adjustable tracks 59, are eliminated. The load unit in which each stackable pallet 155 is guided by the pallet tracks 159 of the next lower stackable pallet 155 or of the longitudinal tracks of the handling pallet can be assembled substantially like the load unit comprising the stackable pallets 55 as shown in FIG. 6 to 11. This may be explained with reference to FIGS. 12a' to 12f': In the position shown in FIG. 12a' a full stackable pallet 155' is still in the filling station and two load units which contain empty stackable pallets 155 are provided over an empty handling pallet 56 in the pallet tower 54 in the elevator.

In the position shown in FIG. 12b' the full stackable pallet 155' has been pushed from the filling station into the pallet tower 54 on pallet tracks of the handling pallet 56. Said pallet tracks are shaped and arranged to correspond to the pallet tracks 159 of the stackable pallets 155 (FIGS. 13 and 14).

In the position shown in FIG. 12c' the elevator has been lowered to such a position that the uppermost empty stackable pallet 155 of the next upper load unit is on the level of the stationary pallet tracks 58 of the filling station and the uppermost empty stackable pallet 155 has already been moved from the pallet tower to the filling station and rests therein on the pallet tracks 58. As said empty stackable pallet is filled, the elevator is raised to the position which is shown in FIG. 12d' and in which the stackable pallet in the filling station has already been filled.

In the position shown in FIG. 12e' the full stackable pallet 155' has been pushed out of the filling station to the stackable pallet which rests on the handling pallet 56. During that pushing into the pallet tower, the full stackable pallet is guided in part on the pallet tracks 58 of the filling station and in part on the tracks 159 of that full stackable pallet which rests on the handling pallet 56.

Figure 12F:
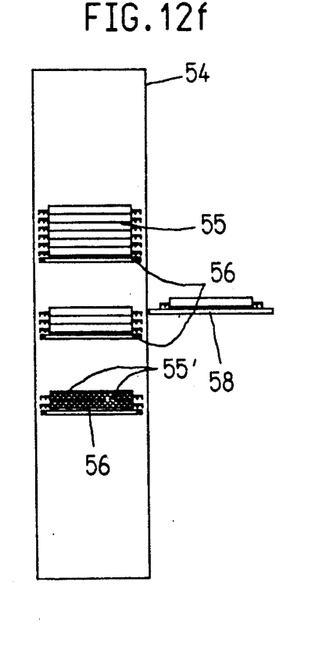

FIG. 12f' shows the position which has been reached after a further process step, in which the elevator is lowered until the uppermost empty stackable pallet 155 of the next upper load unit containing empty stackable pallets is on the level of the pallet tracks 58 of the filling station and can be pushed out of the pallet tower 54 into the filling station to assume the position shown in FIG. 12f'. In the sequence of operations which have been described the load units T; T'; T" are consecutively assembled. When a load unit comprising full stackable pallets 155' has been assembled, that load unit is pulled out of the pallet tower 54 at the rear and is transferred to a truck, which is movable on a path which is parallel to the longitudinal vertical plane of symmetry s—s of the injection molding machine.

When the empty stackable pallets 155 of the respective load units in the pallet tower 154 have been consumed, additional load units comprising empty stackable pallets are supplied to the pallet tower by means of the truck so that the position shown in FIG. 12a' has been obtained.

In the load units which comprise stackable pallets 155 as shown in FIGS. 13 and 14 said stackable pallets 155 will be held by frictional forces against a displacement along the tracks when an upper stackable pallet 155 is displaced on the slide tracks 159 of the next lower stackable pallet 155 or from the corresponding pallet tracks of the handling pallet 56. The magnitude of said frictional forces will be determined by the initial stress under which the end portions 155a' of those walls 155a of the next lower stackable pallet 155 which extend along the pallet tracks bear on the corresponding walls 155a of the next upper stackable pallet 155. Said frictional forces are so determined that they can readily be overcome as that stackable pallet 155 which is disposed on the transfer level, i.e. on the level of the stationary pallet tracks 58 of the filling station, is to be pulled out of the pallet tower 54. In order to ensure that stackable pallets 155 disposed below that transfer level will not be pulled out of the stack together with the stackable pallet 155 which is on said transfer level, stationary vertical stop rods 65 shown in FIG. 2 are provided on the front and rear sides of the pallet tower in such positions that they prevent a horizontal displacement of all stackable pallets in the pallet tower, other than the stackable pallet 155 which is on the transfer level, along the pallet tracks.

I claim:

1. An apparatus for transporting moldings made by injection molding in an injection molding machine, which apparatus comprises
   a plurality of molding receptacles,
   a filling station, which is adapted to hold each of said molding receptacles in a predetermined receiving position for receiving a complement of said moldings from said machine, and
   transfer means for moving said molding receptacles from said filling station,
   the improvement residing in that
   said molding receptacles consist of stackable pallets,
   said transfer means comprise a pallet tower having vertical skeleton members, an elevator, which is vertically movable in said tower along a predetermined path along said vertical skeleton members, and a plurality of vertically spaced apart handling pallets, which are supported by said elevator and each of which is adapted to carry a stack of said stackable pallets to form a load unit in which said stack is supported by said handling pallet, and
   said elevator is adapted to contain at least one of said load units comprising empty ones of said stackable pallets and is adapted to hold one of said handling pallets in consecutive vertically spaced apart positions for consecutively receiving from said filling station a plurality of said stackable pallets when they have received a complement of moldings in said filling station.

2. The apparatus set forth in claim 1, wherein
   said filling station comprises first horizontal pallet tracks for slidably supporting one of said stackable pallets in said receiving position in said filling station and said pallet tower comprises second horizontal pallet tracks, which are adapted to adjoin and to be longitudinally aligned with said first pallet tracks and to slidably support one of said stackable pallets as it moves from said filling station onto said handling pallet which is in position to receive stackable pallets.

3. The apparatus set forth in claim 2, wherein
said filling station and a transporting means are disposed on opposite sides of said pallet tower,
said handling pallets are supported in said elevator on levels which are vertically spaced a predetermined distance apart, and
each of said handling pallets is adapted to carry a plurality of said stackable pallets to form a load unit which has a predetermined height, which is the same for all of said load units and is not in excess of said predetermined distance.

4. The apparatus set forth in claim 3, wherein
said stackable pallets comprise stackable pallets differing in height and
said handling pallets are adapted to carry different numbers of said stackable pallets having different heights to form on each of said handling pallets a load unit having said predetermined height.

5. The apparatus set forth in claim 4, wherein
a first signal generator for detecting one of said stackable pallets in said receiving position is provided in said filling station on one side thereof and
a plurality of additional signal generators are mounted on said elevator over each of said handling pallets in a number which equals the largest possible number of said stackable pallets which can be included in one of said load units and with a spacing that is equal to the height of the smallest of one of said stackable pallets.

6. The apparatus set forth in claim 2, wherein
said second horizontal pallet tracks consist of two tracks, which are mounted in said pallet tower to be laterally movable relative to each other between a first position, in which said second pallet tracks adjoin and are longitudinally aligned with respective ones of said first pallet tracks and extend into said path of said elevator, and a second position, in which said second pallet tracks are spaced a larger distance apart than in said first position and are clear of said path.

7. The apparatus set forth in claim 6, wherein
two hydraulic cylinders are provided, which are supported by said pallet tower and operable to move associated ones of said adjustable tracks between said first and second positions and
each of said hydraulic cylinders comprises a piston rod, which is secured to said associated adjustable track.

8. The apparatus set forth in claim 1, wherein
each of said handling pallets and each of said stackable pallets is formed with open-topped recessed slide tracks extending in the longitudinal direction of pallet tracks and adapted to slidably contact an upwardly adjacent one of said stackable pallets in one of said load units.

9. The apparatus set forth in claim 8, wherein
each of said stackable pallets comprises walls which extend in the longitudinal direction of said pallet tracks and are formed with said slide tracks.

10. The apparatus set forth in claim 9, wherein
said walls of said stackable pallets have end portions formed with said slide tracks,
said slide tracks of each of said handling pallets and of each of said stackable pallets are adapted to engage an upwardly adjacent one of said stackable pallets in each of said load units under an initial stress,
vertical stop rods provided adjacent to said pallet tower on the side thereof which faces said filling station and on the side thereof which faces said transport means and
said vertical stop rods are arranged to prevent a movement of said stackable pallets along said pallet tracks other than to permit only a stackable pallet which is on the level of said pallet tracks to move along said pallet tracks and to permit a movement of one of said stackable pallets out of said pallet tower only when said one pallet is an uppermost pallet of one of said load units and is on a level adjoining said pallet tracks whereas said stop bars prevent a movement of any lower stackable pallet of said load unit out of said pallet tower.

11. The apparatus set forth in claim 1, which comprises injection molds and transporting means operable to receive said molding receptacles from said transfer means, wherein
said transporting means comprise a truck, which is adapted to transport said load units and is also adapted to transport said injection molds having a profiled supporting surface and
each of said handling pallets has a profiled supporting surface, which has the same shape as said profiled supporting surface of said injection molds.

12. The apparatus set forth in claim 11, wherein
said profiled supporting surface of each of said handling pallets comprises two parallel track rails, which are interconnected by at least one crossbar,
said injection mold comprises engaging plates having a predetermined cross-sectional shape and constituting said profiled supporting surface and
said track rails have the same cross-sectional shape as said engaging plates.

13. The apparatus set forth in claim 11, wherein
each of said handling pallets comprises two downwardly facing, parallel track rails, which extend in the longitudinal direction of said pallet tracks,
at least one of said track rails is formed with at least one downwardly open transverse groove,
said elevator is vertically movable to move each of said handling pallets to a predetermined transfer position,
said truck is provided with a horizontal transport chain, which is adapted to extend adjacent to and below one of said handling pallets when it is in said transfer position and which is provided with upwardly protruding coupling means which are engageable with said track rails in said transverse groove,
said truck is operable to move said chain to an operative position, in which said chain is adjacent to and extends under said transverse groove, and
said chain when in said operative position is operable to cause said coupling means to engage said track rails in said groove and then to move said handling pallet in said transfer position from said elevator onto said truck.

14. The apparatus set forth in claim 1, comprising an injection mold and a demolding device which includes a gripper that is operable to remove moldings from said injection mold, wherein said filling station is adapted to be disposed within the vertical projection of said injection molding machine and is adapted to support one of said stackable pallets in predetermined receiving position in which said stackable pallet is adapted to receive said moldings from said gripper.

15. The apparatus set forth in claim 1, comprising an injection mold and a demolding device which includes a gripper that is operable to remove moldings from said injection mold, wherein said filling station is adapted to be disposed outside the vertical projection of said injection molding machine adjacent to one end of said machine and a belt conveyor is provided, which is adapted to receive said moldings from said gripper and to deliver said moldings to said stackable pallet in said receiving position in said filling station.

16. The apparatus set forth in claim 1, wherein drive means are provided, which are operable to transfer one of said stackable pallets between said filling station and said pallet tower, said drive means comprise an endless chain, which is arranged to extend below one of said stackable pallets when it is in said receiving position in said filling station, and two chain sprockets, wherein said chain comprises semicircular portions trained around said chain sprockets, said chain carries at least one coupling pin, which is arranged to move around each of said chain sprockets during an operation of said chain, and each of said stackable pallets is designed to be engaged by said coupling pin to couple said stackable pallet to said chain when said stackable pallet is in said receiving position in said filling station and when said stackable pallet constitutes an uppermost stackable pallet of one of said load units and is disposed on a level which adjoins pallet tracks.

17. The apparatus set forth in claim 1, wherein a lifting screw drive is provided, which is operable to impart a vertical movement to said elevator and comprises a nut, which is secured to said elevator, a vertical screw, which is rotatably mounted on said pallet tower and screwed into said nut, and means for rotating said screw.

18. The apparatus set forth in claim 1, wherein the height of said pallet tower is at least twice the height of said elevator and said elevator is adapted to accommodate at least two of said load units in vertically spaced apart positions.

* * * * *